(12) United States Patent
Tucker et al.

(10) Patent No.: US 8,996,679 B2
(45) Date of Patent: *Mar. 31, 2015

(54) NAMING SYSTEM LAYER

(71) Applicant: CoCo Communications Corp., Seattle, WA (US)

(72) Inventors: Mark L. Tucker, Seattle, WA (US); Jeremy Bruestle, Seattle, WA (US); Riley Eller, Seattle, WA (US); Brian Retford, Seattle, WA (US); Choong Ng, Seattle, WA (US)

(73) Assignee: CoCo Communications Corp, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/223,204

(22) Filed: Mar. 24, 2014

(65) Prior Publication Data

US 2014/0207933 A1    Jul. 24, 2014

Related U.S. Application Data

(63) Continuation of application No. 12/160,599, filed as application No. PCT/US2006/006869 on Feb. 25, 2006, now Pat. No. 8,683,020.

(60) Provisional application No. 60/656,733, filed on Feb. 26, 2005.

(51) Int. Cl.
*G06F 15/173* (2006.01)
*G06F 15/16* (2006.01)
*H04L 12/24* (2006.01)
*H04L 29/12* (2006.01)
*H04W 4/02* (2009.01)
*H04W 8/26* (2009.01)
*H04L 29/08* (2006.01)

(52) U.S. Cl.
CPC .......... *H04L 41/12* (2013.01); *H04L 29/12132* (2013.01); *H04L 29/12594* (2013.01); *H04L 61/1552* (2013.01); *H04L 61/303* (2013.01); *H04W 4/02* (2013.01); *H04W 8/26* (2013.01); *H04L 29/12801* (2013.01); *H04L 61/6004* (2013.01); *H04L 67/18* (2013.01)
USPC .......................................... 709/223; 709/221

(58) Field of Classification Search
USPC ....................................................... 709/223
See application file for complete search history.

(56) References Cited

U.S. PATENT DOCUMENTS 6,047,283 A    4/2000    Braun
6,085,238 A    7/2000    Yuasa et al.
(Continued)

FOREIGN PATENT DOCUMENTS

EP    1 355 477 A2    10/2003
WO    02/10912 A1    2/2002

*Primary Examiner* — Gerald Smarth
(74) *Attorney, Agent, or Firm* — Lowe Graham Jones PLLC

(57) ABSTRACT

A facility for publishing information in a distributed network without a central management infrastructure is described. In various embodiments, the facility receives an indication of a new node and a destination node, the new node omitted from a contact list associated with the destination node, the contact list having an approximately logarithmic distribution of neighboring nodes; introduces the new node to the destination node via a permanent circuit; and causes the destination node to add the new node to the contact list when adding the new node improves the logarithmic distribution of neighboring nodes.

10 Claims, 4 Drawing Sheets

(56) References Cited

U.S. PATENT DOCUMENTS

| | | |
|---|---|---|
| 6,188,973 B1 | 2/2001 | Martinez et al. |
| 6,442,615 B1 | 8/2002 | Nordenstam et al. |
| 6,505,254 B1 | 1/2003 | Johnson et al. |
| 6,987,764 B2 | 1/2006 | Hsu |
| 7,398,250 B2 | 7/2008 | Blinn et al. |
| 7,864,708 B1 * | 1/2011 | Bryant et al. ............ 370/255 |
| 2001/0040895 A1 | 11/2001 | Templin |
| 2002/0031131 A1 | 3/2002 | Yemini et al. |
| 2002/0059622 A1 | 5/2002 | Grove et al. |
| 2002/0067736 A1 | 6/2002 | Garcia-Luna-Aceves et al. |
| 2002/0143989 A1 | 10/2002 | Huitema et al. |
| 2002/0145978 A1 | 10/2002 | Batsell et al. |
| 2002/0150086 A1 | 10/2002 | Bailey et al. |
| 2003/0172180 A1 | 9/2003 | Reynders et al. |
| 2003/0182421 A1 | 9/2003 | Faybishenko et al. |
| 2003/0202476 A1 | 10/2003 | Billhartz et al. |
| 2003/0204625 A1 | 10/2003 | Cain |
| 2003/0235175 A1 | 12/2003 | Naghian et al. |
| 2004/0034619 A1 | 2/2004 | Lu et al. |
| 2004/0044794 A1 | 3/2004 | Srinivasan |
| 2004/0054807 A1 | 3/2004 | Harvey et al. |
| 2004/0153624 A1 | 8/2004 | Zhou et al. |
| 2004/0246933 A1 | 12/2004 | Valko et al. |
| 2004/0254891 A1 | 12/2004 | Blinn et al. |
| 2005/0210150 A1 | 9/2005 | Bahl |
| 2006/0136721 A1 | 6/2006 | Bruestle et al. |
| 2010/0262650 A1 * | 10/2010 | Chauhan et al. ............ 709/203 |

\* cited by examiner

NAMING SYSTEM LAYER

CROSS-REFERENCE TO RELATED APPLICATION(S)

This patent application is a Continuation Application of U.S. Non-Provisional application Ser. No. 12/160,599, filed May 9, 2009, and entitled "NAMING SYSTEM LAYER," which issued to U.S. Pat. No. 8,683,020 on Mar. 25, 2014, and which is a U.S. National Stage application of International Application No. PCT/US06/06869, filed Feb. 25, 2006, and entitled "NAMING SYSTEM LAYER," which claims the benefit of U.S. Provisional Patent Application Ser. No. 60/656,733, which was filed on Feb. 26, 2005, entitled "CoCo Naming System Layer," the contents of which are incorporated herein by reference in their entireties.

BACKGROUND

Computers have been networked to exchange data between them for decades. One network, the Internet, comprises a vast number of computers and computer networks interconnected through communication channels. In general, computers are made aware of other computers by referencing a domain name server or some other server that is aware of a number of interconnected devices. However, these servers require the interconnected computers to be fixed in space. As an example, when a portable computing device moves from one geographical location to another, its Internet Protocol address could change.

DETAILED DESCRIPTION

Figure 1:
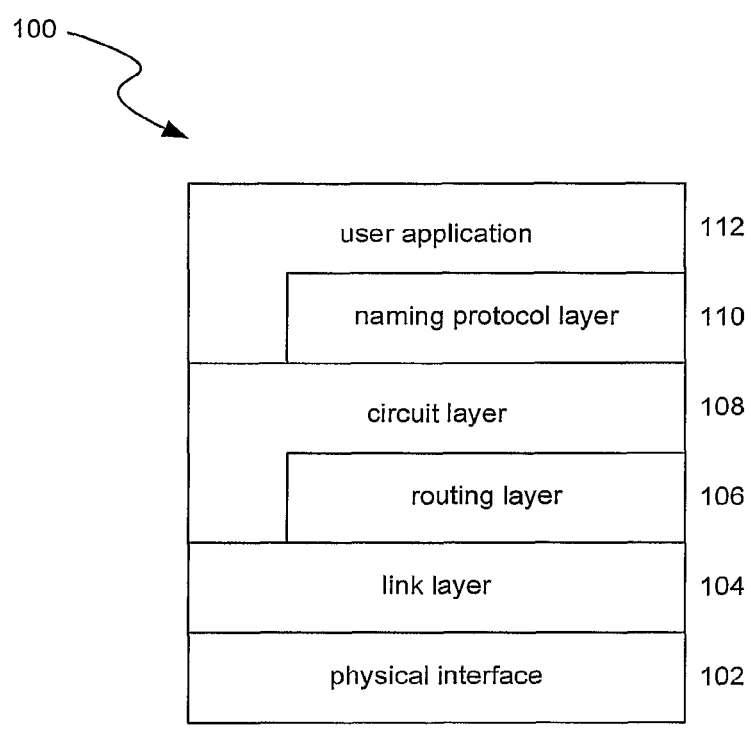
FIG. 1 is a block diagram illustrating layers of a CoCo protocol.

A naming system facility is provided. In some embodiments, the naming system facility is the highest protocol layer in the CoCo Protocol hierarchy excluding the user application layer, as is illustrated in FIG. 1. In broad terms, the naming system is a mechanism that enables nodes to locate each other in a CoCo hierarchical network. The naming system exposes an application program interface to provide access to the naming system's services. The naming system is located "above" the circuit layer because it uses circuits to maintain connections between nodes.

FIG. 1 is a block diagram illustrating layers of a CoCo protocol. The protocol employs several layers 100, including a physical interface layer 102, link layer 104, routing layer 106, circuit layer 108, naming layer 110, and user application layer 112. The naming and circuit layers are described herein.

Addressing

The described protocol is the logical separation of a device's name from its location. The term "location" (rather than "address") is meant to suggest that it varies during a session as the network dynamically reconfigures. Each CoCo device is provisioned with a name that exists for the lifetime of the device. The name is a hierarchically-structured string resembling an Internet domain name—for example "smith.police.seattle.wa.us." The location of a device is a numeric quantity, similar to an Internet IP address.

As IP addresses may be conceptually decomposed into subnet addresses, CoCo network locations have a hierarchical decomposition. There are, however, significant differences between CoCo network locations and IP addresses. Internet servers and devices have fixed IP addresses. Even computers connecting through a dial-up phone line are assigned an IP address that remains fixed for the duration of the session. A CoCo device's location may change over time as the device moves. If nearby devices move, a CoCo device's location may change even if it remains geographically stationary.

The Purpose of the Naming System

A CoCo device name is a concatenation of dot-delimited strings such as "police.seattle.wa.us," while a device's network location has the form: [Dn, Dn−1, . . . D1, D0]. CoCo device locations may change over time as they move, or even as devices around them move. The CoCo Protocol Routing Layer RFC explains how a node S routes packets to another node D given its location. Before this can happen, S must first learn the location of D, given its name. The naming system provides a method for doing so: it is a distributed lookup mechanism to obtain a device's name from its location.

CoCo networks maintain two concepts of node identity. One concept is a name. This name might sometimes be referred to as a friendly name or a network name. This document uses the term name for conciseness. Names are hierarchically structured ("dot"-delimited) ASCII strings. For example, the following might be a name of a node in a CoCo network:

coco.us.washington.seattle.police.frank

Figure 2:
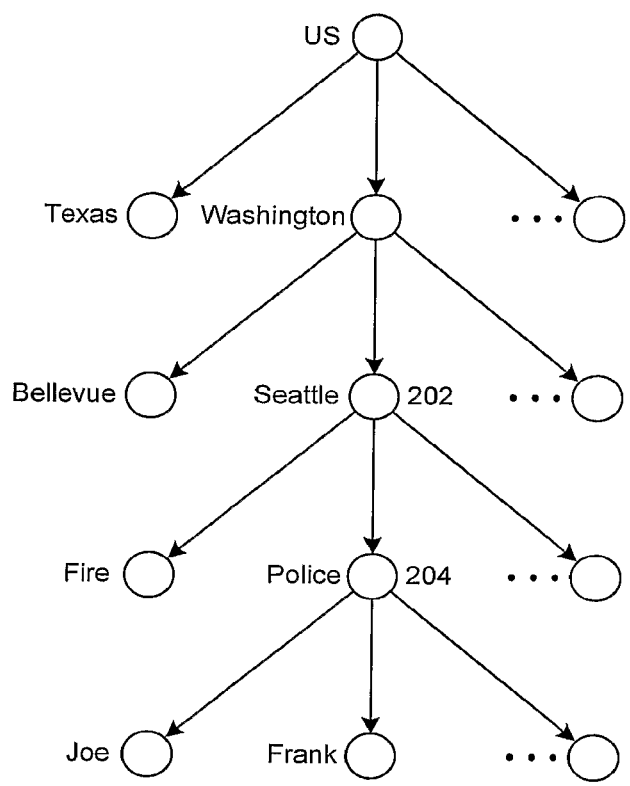
FIG. 2 is a tree diagram illustrating a tree fragment associated with the naming system layer.

The CoCo network node with this name is part of a hierarchy that might be represented by a tree a fragment, as is illustrated in FIG. 2.

Naming System Properties

The naming system is completely decentralized and distributed. It self-generates when a network first forms and it self-adjusts when the network topology changes. DNS, by comparison, requires human intervention to update server IP addresses and much longer delays for such changes to propagate through the network. Names in the CoCo naming system are unforgeable because they are cryptographically secure. Each device may be assigned a name when it is originally provisioned. It is possible to delegate the authority to assign names. For example, the city of Seattle may delegate to the police commissioner the authority to distribute names for the network devices used by members of the Seattle Police department. This is indicated in FIG. 2 as node 202 providing authority to node 204.

The Naming System Interface

Figure 3:
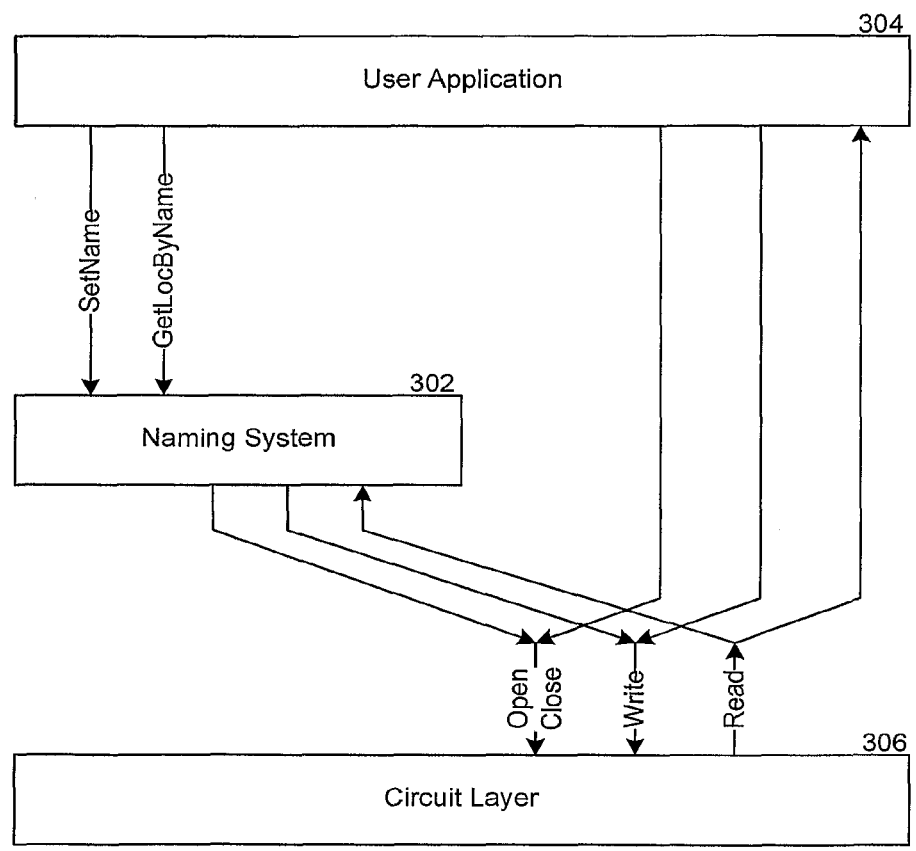
FIG. 3 is a block diagram illustrating relationships between application program interfaces of layers associated with the naming system layer.

FIG. 3 illustrates a detailed view of how the naming situation relates to the other layers in the CoCo Protocol:

A naming system 302 exposes a simple application program interface to user applications 304. This interface includes a method to set a <name, location> association and another method to obtain the location of a node, given its name:

```
SetName (name, location);
location GetLocByName(name);
```

The naming system, like user applications, uses a circuit layer system 306 calls to open and close circuits and to read from and write to circuits.

```
CircuitID Open( );
Close(CircuitID);
Packet Read(CircuitID);
Write(Packet, CircuitID);
```

The naming system uses circuits to give a more useful response to requests for node locations. One variant of the method location GetLocByName (name) is the method CircuitID GetLocByName (name) where GetLocByName returns circuit ID to the location that corresponds to name, rather than just location itself. This approach has two advantages:
 1. The location of a node may change frequently. Maintaining an open circuit to it exploits the circuit layer's facility of keeping the location of circuit destinations up-to-date.
 2. Typically, a user application invokes GetLocByName to establish a circuit to a node. If the naming system maintains an active circuit, the user can more efficiently send the node a request to establish a new circuit to it.

The second alternative may cause high overhead to maintain all the required open circuits.

The Hierarchical of the Naming System

Hierarchical Structure of the Namespace

The naming system is hierarchical. The discussion above presented the naming system as a single ring for simplicity. In fact, there is a hierarchy of naming rings. To extend the example name "smith.police.seattle.wa.us" introduced earlier, there is a ring for each level of the name. These rings are illustrated in FIG. 4.

Figure 4:
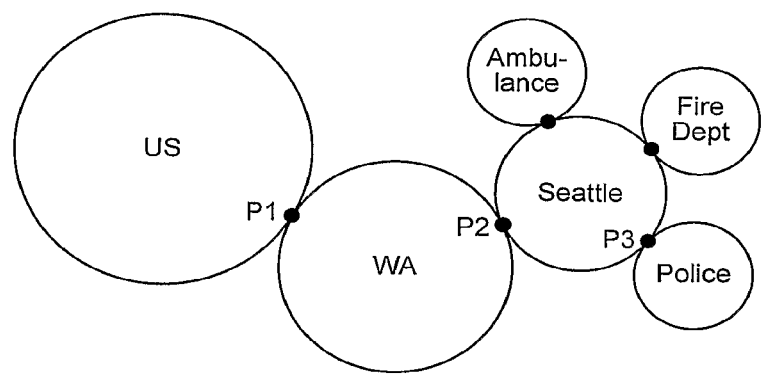
FIG. 4 is a ring diagram illustrating rings corresponding to names associated with the naming layer.

According to FIG. 4,
 wa hashes to P1 on the us ring
 seattle hashes to P2 on the wa.us ring
 police hashes to P3 on the seattle.wa.us ring and
 names of the form xxx.wa.us appear on the wa.us ring
 names of the form xxx.seattle.wa.us appear on the seattle.wa.us ring
 names of the form xxx.police.seattle.wa.us appear on the police.seattle.wa.us ring.

The expanded hierarchical view of the name space in FIG. 4 illustrates the dominance of local network traffic and the desirability of a logarithmic distribution of keys in the contact table. It is reasonable to expect, for example, that most of the traffic to and from the device with name smith.police.seattle.wa.us would involve devices with names of the form x.police.seattle.wa.us more than with devices with names of the form x.police.beijing.china.

The Contact Table

Each node maintains a contact table of other selected network nodes. The contact tables of all the nodes in the network are, in effect, a distributed database.

Table entries have the form <key, location> where key is the hash of the name of a node, and location is that node's network location. In practice, the location field may be a circuit table entry for a circuit to that location, rather than the location itself.

The key field is ordered so that a metric, or distance, may be defined on the set of keys. A convenient metric defines the distance between two keys as the arithmetic difference of the bit patterns of the keys, viewed as integers modulo the size of the key space. It is convenient to view the key-space as a ring, as in FIG. 5.

Figure 5:
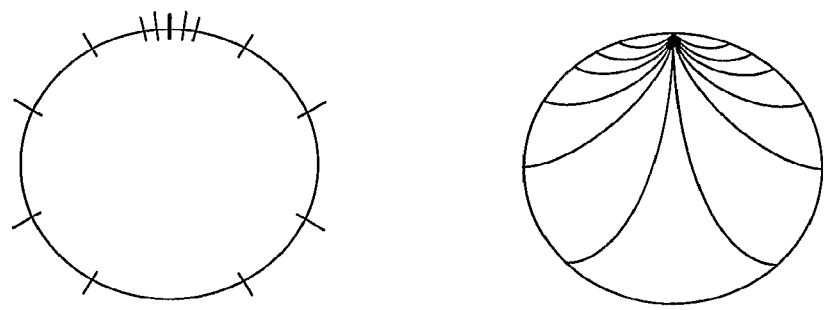
FIG. 5 is a ring diagram illustrating key-spaces associated with the naming layer.

Initially, the table for a node contains its own key-location pair. As a node becomes aware of other nodes, it adds them to its contact table. It adds nodes selectively, so that the keys of the table entries are distributed logarithmically through the key space, as is depicted in FIG. 5. Using a logarithmic distribution keeps contact tables from outgrowing reasonable space constraints. The basis for a logarithmic distribution is a scalable trade-off between memory consumption and bandwidth usage. When a node A needs the location of another node B, it computes B's key and sends a location lookup request to the node in its contact table whose key is closest to the key of B.

To make the logarithmic distribution precise, let K=hash (N). Then K is a value in the key-space which is the set of all 32-bit values. For each value d between 0 and the key-space size, let $N_d$ be the number of entries in the contact list for N whose keys are a distance less than d from K=hash (N). Then $N_d$ has the following property:

$$N_d = |\{N' \text{ such that} |\text{hash}(N) - \text{hash}(N')| < d\}| < c \log d$$

where c is a constant and the subtraction is performed modulo the size of the keyspace. In essence, this inequality states that the distribution of the keys of the entries in a node N's contact list occur increasingly sparsely at greater distances from the hash value of N.

Contact lists have another property. The logarithmic distribution of the equation, makes no requirement about the precise location on the key ring of any nodes in the contact list. However, for a contact list to be valid and fully functional, it should be in a state of convergence. The next section describes this property.

Naming System Convergence

The state of the naming system is converged if the contact table of each node contains that node's two nearest neighbors (with respect to the metric). To achieve convergence, the naming system uses a distributed message passing algorithm. This algorithm employs a primitive called introduce, which has the format introduce (source, dest, new).

The effect of introduce is to make the node dest aware of new's name and location. The node source "introduces" new to dest by sending a message to dest over a permanent circuit. IN some embodiments, each node maintains dedicated circuits to the nodes in its contact table. Node dest may add new to its contact list if doing so improves the approximation of logarithmic distribution in the list.

The convergence algorithm uses a series of introduce messages among selected nodes in the network. A node X that wishes to join the network initially detects the presence of another node Y and establishes a link to it, as described previously. To integrate itself into the naming system, node X sends an introduce message to introduce itself to Y. Node Y then finds the node in its contact table closest to X and clockwise from Y. This causes a limited cascade of messages from one node to another, proceeding in a clockwise sequence around the ring with each node in the sequence being introduced to X. When the process ends, X knows the identity of its immediate clockwise and counterclockwise neighbors.

Primitives and Algorithms for Naming System Convergence

The naming system can utilize the following primitives.

node NextClockwise(Node X), node NextAntiClockwise (Node X)

This method returns the node whose key is closest to X's key in either the clockwise or counterclockwise direction.

Introduce (Node source, Node dest, Node new)

Node source introduces dest and new to each other by sending a message to dest. This message is sent over a dedicated circuit. Node dest may then choose to add new to its contact list. It will typically do so, unless its contact list is already full, and correctly (logarithmically) distributed.

A AddToContactList (Node source) method causes a node to add source to its contact list.

Using these primitives, the following algorithm provides a simplified implementation of convergence in various embodiments.

```
JoinNetwork (node X) // X calls this on itself to
join network
{
    Y = node whose presence the X's link layer detects
    introduce (source = X, dest = Y, about X) // X
    introduces itself to Y
}
// performed by dest when it receives introduce
(source, dest, about)
onRecieveIntroduction (from, new)
{
    if (contact list becomes more logarithmically
distributed)
        AddToContactList (from)
    Y = NextClockwise (new)
    if Y < from // in this context, from is X; "<" =
"clockwise of"
        introduce(self, from, Y)
}
```

Managing a Densely-Populated Broadcast Communication Medium

A second application of the algorithms used for the CoCo Naming Layer is to manage a densely-populated broadcast communication medium. By creating a Contact Table populated with the transport-specific node addresses and executing the Naming System Convergence algorithm, we gain strong link security in trade for changing network efficiency from linear to logarithmic-scale. Utilizing a second Contact Table of most recently contacted destinations, the node can increase best-case efficiency to match the underlying network. Because network nodes tend to communicate with extremely regular local-routing behavior, the average case is similar to the best case. Thus, for relatively small efficiency cost in most situations, we avoid entirely a class of network security failings.

The CoCo Protocol provides a communications technology with several innovations: greatly increased security; flexible support for a wide range of Quality of Service (QoS) requirements; interoperability with standard transport mechanisms such as WiFi, cellular, Ethernet, and satellite links; and a novel addressing system that enables scalability in an environment consisting of a large number of mobile devices.

The following publications are incorporated herein by reference in their entireties:

1. J. Bruestle, P. Mark, CoCo Protocol Architecture White Paper, CoCo Communications Corp., 2004.
2. J. Bruestle, R. Eller, P. Mark, CoCo Protocol Link Layer RFC, CoCo Communications Corp., 2004.

Coco has filed the following patent applications, the disclosures of which are incorporated herein by reference in their entireties:

1. U.S. patent application Ser. No. 10/542,824, filed on Jul. 20, 2005.
2. U.S. Provisional Patent Application Ser. No. 60/640,810, filed on Dec. 29, 2004.
3. U.S. Provisional Patent Application Ser. No. 60/655,808, filed on Feb. 23, 2005.

A method performed by a computer system for publishing information in a distributed network without a central management infrastructure is described. In various embodiments, the method receives an indication of a new node and a destination node, the new node omitted from a contact list associated with the destination node, the contact list having an approximately logarithmic distribution of neighboring nodes; introduces the new node to the destination node via a permanent circuit; and causes the destination node to add the new node to the contact list when adding the new node improves the logarithmic distribution of neighboring nodes.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A node of a distributed network, the distributed network comprised of a plurality of nodes, the node comprising:
   an interface that communicatively couples the node to a destination node of the distributed network via at least one permanent circuit; and
   a computer system, wherein the computer system is operable to:
      receive an indication of a new node and the destination node, the new node omitted from a contact list associated with the destination node, the contact list having a logarithmic distribution (c log d) of neighboring nodes;
      introduce the new node to the destination node via a permanent circuit; and
      cause the destination node to add the new node to the contact list when adding the new node improves the logarithmic distribution (c log d) of neighboring nodes,
   wherein K=hash(N) and is a value in a key-space,
   wherein for each value d between 0 and a key-space size, Nd is a number of entries in the contact list for N whose keys are a distance less than d from K=hash(N), such that Nd is defined as:

$$Nd=|\{N' \text{ such that } |\text{hash}(N)-\text{hash}(N')|<d\}|<c \log d$$

wherein c is a constant, and
   wherein the inequality states that the distribution of the keys of the entries in a node N's contact list occur increasingly sparsely at greater distances from the hash value of N.

2. The node of claim 1, wherein other ones of the plurality of nodes of the distributed network identified in the contact list are logarithmically distributed when their distance is increasingly sparse at greater distances from a reference node.

3. The node of claim 2, wherein the distance is calculated based on a hash value, the hash value based on a name of the new node.

4. The node of claim 3, wherein the hash value defines a key for the new node.

5. The node of claim 4, wherein a distance between keys is an arithmetic difference.

6. The node of claim 1, wherein the computer system is further configured to attempt to converge the distributed network, wherein the distributed network is converged when contact tables associated with each of the plurality of nodes of the distributed network contain that node's two nearest neighbors.

7. The node of claim 1, wherein the indication of the new node is received from the new node.

8. A distributed network comprising:
a plurality of nodes, comprising:
- a named node;
- a destination node; and
- a new node that is not initially interconnected to other nodes of the distributed network,
- wherein each one of the nodes is uniquely identified by a hierarchically structured string of identifiers that indicate a physical location associated with the named node; and a plurality of permanent circuits that communicatively interconnect the plurality of nodes;

wherein a key associated with each of the nodes is represented as a plurality of hashes, wherein each of the keys are associated with one of a plurality of the hierarchical naming rings which its respective node is a member of, and wherein each hierarchical naming ring has a logarithmic distribution (c log d) of its respective keys, wherein the new node becomes interconnected with the plurality of nodes of the distributed network when the named node receives an introduce message from the new node at an immediate neighbor node, wherein the new node and the immediate neighbor node are on a portion of the distributed network associated with a first one of the plurality of the hierarchical naming rings, wherein information pertaining to the new node is omitted from a contact table stored by the immediate neighbor node, wherein the contact table identifies each of the existing nodes using a <key, location> pair, and wherein the location of the <key, location> pair identifies a network location of the node, wherein a hash for the new node is determined, wherein the determined hash for the new node corresponds to the position of the new node on the first one of the plurality of the hierarchical naming rings, wherein a new <key, location> pair of the new node is determined, wherein the key includes the determined hash of the new node on the first one of the plurality of the hierarchical naming rings and the hashes for the remaining ones of the plurality of the hierarchical naming rings associated with the immediate neighbor node, and wherein the location of the new <key, location> pair identifies a network location of the new node, and wherein the new <key, location> pair is stored in the contact table of the at least one immediate neighbor node, wherein K=hash(N) and is a value in a key-space, wherein for each value d between 0 and a key-space size, Nd, is a number of entries in the contact list for N whose keys are a distance less than d from K=hash(N), such that Nd is defined as:

$$N_d = |\{N' \text{ such that } |hash(N)-hash(N')|<d\}| < c \log d$$

wherein c is a constant, and wherein the inequality states that the distribution of the keys of the entries in a node N's contact list occur increasingly sparsely at greater distances from the hash value of N.

9. The distributed network of claim 8, wherein the plurality of the hierarchical naming rings comprises at least a first hierarchical naming ring, a second hierarchical naming ring, and a third hierarchical naming ring, wherein the new node and the immediate neighbor node are members of the third hierarchical naming ring, and not a member of the second hierarchical naming ring, wherein an intermediate node is associated with the first hierarchical naming ring, wherein a remote existing node is a member of the second hierarchical naming ring, and not a member of the first hierarchical naming ring, and wherein at least the new node and the immediate neighbor node are members of the first hierarchical naming ring.

10. The distributed network of claim 9, wherein a message is communicated from the new node to the immediate neighbor node over a first permanent circuit identified by a first <key, location> pair stored in a first contact table of the new node, wherein the message is communicated from the immediate neighbor node to the intermediate node over a second permanent circuit identified by a second <key, location> pair stored in the contact table of the immediate neighbor node, and wherein the message is communicated from the intermediate node to the remote node over a third permanent circuit identified by a second <key,location> pair stored in a second contact table of the intermediate node.

\* \* \* \* \*